Figure 1:
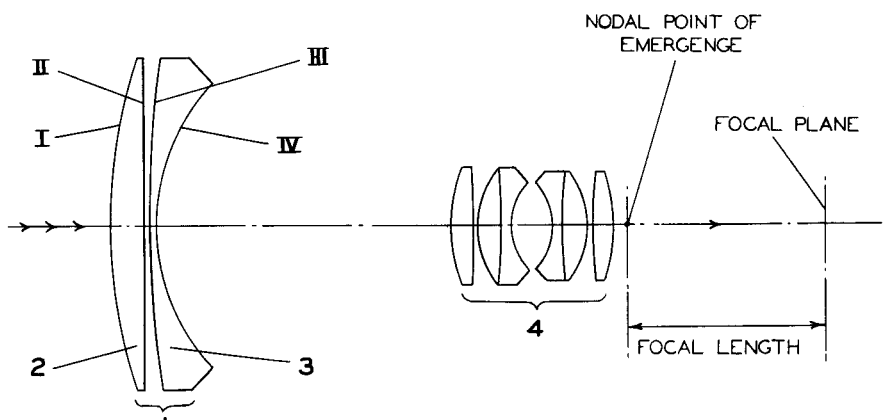

April 17, 1934.     H. W. LEE     1,955,590
LENS
Filed Oct. 17, 1930

INVENTOR
HORACE WILLIAM LEE
BY
his ATTORNEY

Patented Apr. 17, 1934

1,955,590

UNITED STATES PATENT OFFICE 1,955,590

LENS

Horace William Lee, Leicester, England, assignor to Kapella Limited, Leicester, England, a corporation of England Application October 17, 1930, Serial No. 489,261
In Great Britain July 12, 1930

4 Claims. (Cl. 88—57)

This invention relates to lens systems of the kind comprising a compound collective member and a compound dispersive member placed on the longer conjugate side of the collective member. While the invention is not restricted thereto, it is especially applicable to lens systems of this kind in which the clearance between the focal plane and the nearest element of the lens is made abnormally large by moving the back or rear nodal point of the lens backwardly so that instead of such point being within the lens system (usually about in the centre thereof) the back nodal point is near the rearmost surface of the lens system, preferably at a distance behind such surface. This provides more room between the lens and the photographic film than would be the case were the nodal point at or near the centre of the lens system.

One method by which this shifting of the nodal point is produced is by the use of an optical system composed of a collective member and a compound dispersive member placed between the collective member and the object.

It has been found that the dispersive member must have certain characteristics if it is desired to avoid distortion and/or enable lenses with apertures greater than f/8 to be constructed.

These advantageous results are obtained in part by particular shape, construction and arrangement of the lenses, and in part by observing certain definite relationships in the optical properties of such lenses and of the glass forming the same.

The invention is described with reference to the accompanying specifications and sectional drawing, Figs. 1 and 2, in which are shown two alternative forms of lens.

In each of these the collective member 4 is separately corrected. As shown, this latter member has an aperture about f/2, but members of aperture f/1.8 or even f/1.4 may be used successfully.

The dispersive member 1 is separately corrected for distortion and consists of a collective component 2, and a dispersive component 3 placed between said collective component and the collective member 4.

The lens system, therefore, consists solely of two parts, one collective and the other dispersive, the dispersive part being positioned between the collective part and the longer conjugate for which the system is corrected. The collective part forms a real image of the object (when the lens system is used in a camera, for example), while the dispersive part enlarges that image.

To effect the correction of distortion, the collective component 2 is made with an amount of positive astigmatism in excess of that necessary to correct the negative astigmatism of the dispersive component 3, and the balance of astigmatism is adjusted in the usual manner in relation to the separator of the dispersive system from the collective system. By "positive astigmatism" we mean that kind of astigmatism which is associated with a simple collective lens uncorrected for astigmatism.

The dispersive member, if constructed of only two glasses or component lenses, cannot be corrected simultaneously for axial aberrations, astigmatism, and distortion, and the best method is to correct the distortion of the dispersive member in such manner as to leave therein a residue of positive astigmatism, this being corrected by modification of the collective member.

The said balance of astigmatism is obtained by making the sum of the powers of all of the internal optical surfaces of the dispersive part of the system collective. In other words, in the form of construction illustrated, by giving the adjacent surfaces II and III of the components 2 and 3 such a form or forms as to have a combined collective effect, that is to say, the power of that surface II of the collective component 2 is algebraically greater than that of the surface III of the dispersive component 3. The collective power of the adjacent surfaces II and III must be at least one-fifth (numerically considered) of the power of the dispersive member.

This collective effect may be obtained in one or other or both of two ways, either by giving the adjacent surfaces different curvatures so as to give a collective action or by using lenses having adjacent surfaces of equal curvature formed of glass of different index of refraction. These two methods are illustrated in Figs. 1 and 2 respectively. The two methods may be used simultaneously.

The components 2 and 3 may be spaced apart by an amount which, measured on the axis, should not ordinarily exceed the thickness of the collective component 2 and in any case should not be more than three or four times such thickness. Such a spacing is shown in Fig. 1 as having the form of a dispersive lens, and this we prefer, but it may have the form of a collective lens.

Figure 2:
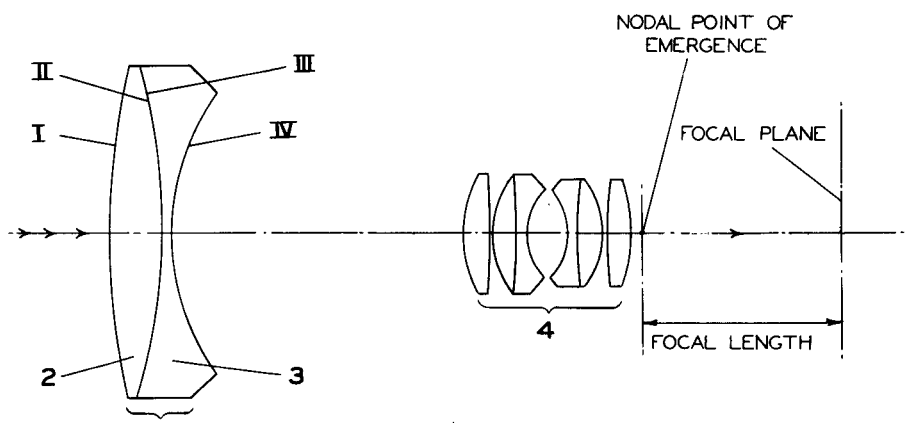

Alternatively, as above suggested, the components 2 and 3 may have their adjacent surfaces of the same radius so as to permit of their being cemented in contact as shown in Fig. 2. In this case we make the collective component 2 with a refractive index so much greater than that of the dispersive component 3 as to make the contact surfaces concave to the oncoming light, and of such collective power as to provide the necessary amount of correcting astigmatism. To provide a reasonable form, the difference of refractive index of the two components of the dispersion lens system for the D-ray of the solar spectrum must be at least 0.05.

The glasses from which the components 2 and 3 are constructed may be so chosen as to correct the color errors, and the shapes of the components may be such as to reduce to a minimum the residual errors of spherical aberration and coma. Either or both of the components may be made compound for the purpose of better correcting the residual aberrations.

In the examples given, the collective member 4 is placed at such a distance from the dispersive member 1 that the effective stop distance from the posterior surface IV of the dispersive system is within 10 per cent of 3 inches.

As the dispersive member is moved outwardly away from the collective member, the nodal point of emergence moves rearwardly. For this reason, to secure the space desired behind the collective member, the dispersive member should preferably be spaced in front of the collective member by an axial distance at least equal to the focal length of the system, more advantageously about one and a half times the focal length or even more.

The diameter of the dispersive member should be greater than that of the collective member by an amount increasing with the distance between the two members so that the field of the lens system is not cut down by the mount of the dispersive member. The system shown has a field of view of 50°.

Each dispersive member is corrected for color aberration.

*Example I.—Separated dispersive member, shown in Fig. 1*

| Radii | Thickness | Separation | Refractive index for the D-line | V |
|---|---|---|---|---|
| Plus 3.8 | | | | |
| Plano | .30 | | 1.651 | 33.7 |
| Plus 9.664 | | .01 | | |
| Plus 1.603 | .05 | | 1.6135 | 59.4 |

*Example II.—Cemented dispersive member, shown in Fig. 2*

| Radii | Thickness | Separation | Refractive index for the D-line | V |
|---|---|---|---|---|
| Plus 6.5 | | | | |
| −4.0 | .4 | | 1.668 | 35.6 |
| Plus 1.8 | .05 | | 1.515 | 56.9 |

All dimensions are in inches and the radius is denoted plus when it is convex to the incident light.

V in the above table is given by the following equation, where $N_D$ = refractive index for sodium D line
$N_F$ = refractive index for hydrogen blue line
$N_C$ = refractive index for hydrogen red line $$V = \frac{N_D - 1}{N_F - N_C}$$

The invention is not limited to the systems illustrated, nor to systems constructed proportionately thereto, as the exact form of the dispersive member will depend on the form of the collective member and the desired position of the nodal planes.

We give here particulars of a corrected collective member suitable for use in conjunction with either of the dispersive members defined in Examples I and II:

| Radii | Thickness | Separation | Refractive index for the D-line | V |
|---|---|---|---|---|
| Plus 1.24 | | | | |
| Plus 7.38 | .155 | | 1.573 | 57.3 |
| Plus .748 | | .02 | | |
| −6.89 | .189 | | 1.6135 | 59.4 |
| Plus .502 | .086 | | 1.612 | 38.0 |
| −.512 | | .30 | 1.579 | 40.4 |
| Plus 4.49 | .086 | | | |
| −.689 | .189 | | 1.6235 | 56.3 |
| Plus 3.936 | | .02 | | |
| −1.524 | .155 | | 1.573 | 57.3 |

In the combination of this collective member with either of the dispersive members described, the aperture is f/2, and the distance from the last surface of the whole combination to the focal plane is about 10% greater than the equivalent focal length.

It will be noted that in both examples all of the optical surfaces are spherical, since even the plane surface of component 2 of Fig. 1 is merely a spherical surface of infinite radius.

What is claimed is:

1. A lens system, consisting solely of two parts, one collective and the other dispersive, the dispersive part being positioned between the collective part and the longer conjugate for which the system is corrected, each of said parts taken as a whole being corrected for distortion independently of the other, the dispersive part comprising a dispersive component and a collective component separated by an air space having the shape of a dispersive meniscus lens and having the sum of the powers of all the interior optical surfaces of such dispersive part collective, and the system having all of its optical surfaces spherical.

2. A lens system, consisting solely of two parts, one collective and the other dispersive, the dispersive part being positioned between the collective part and the longer conjugate for which the system is corrected, each of said parts taken as a whole being corrected for distortion independently of the other, the dispersive part consisting solely of a dispersive component and a collective component, the adjacent surfaces of which are of the same radius, are in contact and are concave to the incident light, and the refractive index of the collective component for the D-ray of the solar spectrum is at least 0.05 greater than that of the dispersive component and having the sum of the powers of all the interior optical surfaces of such dispersive part collective, and the system having all of its optical surfaces spherical.

3. A lens system consisting solely of two parts, one collective and the other dispersive, the dispersive part being positioned between the collective part and the longer conjugate for which the system is corrected, and consisting of two elements only, one dispersive and the other collective, the sum of the powers of the adjacent surfaces of such elements being collective, both said parts being independently corrected for distortion and jointly corrected for astigmatism, the said collective element having an amount of positive astigmatism in excess of that necessary to correct the negative astigmatism of the said dispersive element, the said collective part having an amount of negative astigmatism substantially equal to said excess positive astigmatism, and the system having all of its optical surfaces spherical.

4. A lens system consisting solely of two parts, one collective and the other dispersive, the dispersive part being positioned between the collective part and the longer conjugate for which the system is corrected, the two parts being separately corrected for distortion and jointly corrected for astigmatism, the astigmatism of one part being of opposite sign to but approximately equal in magnitude to that of the other part, and the system having all of its optical surfaces spherical.

HORACE WILLIAM LEE.